United States Patent
Hudson

(10) Patent No.: US 7,673,393 B1
(45) Date of Patent: Mar. 9, 2010

(54) LINE BLOCK

(76) Inventor: Robert E. Hudson, 5841 Mineral Springs Rd., Suffolk, VA (US) 23438

( * ) Notice: Subject to any disclaimer, the term of this patent is extended or adjusted under 35 U.S.C. 154(b) by 0 days.

(21) Appl. No.: 12/319,269

(22) Filed: Jan. 5, 2009

(51) Int. Cl.
*G01C 15/10* (2006.01)

(52) U.S. Cl. ............................... 33/409; 33/407; 33/408

(58) Field of Classification Search ............... 33/340, 33/404, 407–409, 613; D10/64; D8/71
See application file for complete search history.

(56) References Cited

U.S. PATENT DOCUMENTS

| | | | | | |
|---|---|---|---|---|---|
| 1,594,836 | A | * | 8/1926 | Ingram | 33/408 |
| 2,529,056 | A | * | 11/1950 | Sprowl | 33/408 |
| 2,544,645 | A | * | 3/1951 | Alwood | 33/407 |
| 2,559,697 | A | * | 7/1951 | Anders | 33/409 |
| 2,659,973 | A | * | 11/1953 | Patzel | 33/410 |
| 2,806,290 | A | * | 9/1957 | Tiefel | 33/408 |
| 2,865,107 | A | * | 12/1958 | Castano | 33/409 |
| 2,893,125 | A | * | 7/1959 | Kampel | 33/407 |
| 3,039,195 | A | * | 6/1962 | Litty | 33/404 |
| 3,200,500 | A | * | 8/1965 | Stone | 33/409 |
| 3,408,742 | A | * | 11/1968 | Caprio et al. | 33/409 |
| 3,626,434 | A | * | 12/1971 | Miller | 33/408 |
| 4,095,343 | A | * | 6/1978 | McPhail | 33/1 LE |
| 4,599,804 | A | * | 7/1986 | Amos | 33/408 |
| 7,409,771 | B2 | * | 8/2008 | Bond | 33/409 |
| 2007/0130878 | A1 | * | 6/2007 | Davis | 52/749.13 |

* cited by examiner

*Primary Examiner*—G. Bradley Bennett
*Assistant Examiner*—Tania C Courson
(74) *Attorney, Agent, or Firm*—Bowman Green Hampton & Kelly, PLLC

(57) ABSTRACT

A line block having a body; a first leg extending substantially perpendicular to a longitudinal axis of the body; a first leg quoin line groove extending from a front surface of the first leg; a first leg wall line groove extending from a bottom surface of the first leg; a second leg spaced apart from the first leg, wherein the second leg extends substantially perpendicular to a longitudinal axis of the body, wherein a corner pole receiving groove is defined between at least a portion of the body, the first leg, and the second leg; a second leg quoin line groove extending from a front surface of the body and a front surface of the second leg, along a portion of an inner wall surface of the second leg; and a second leg wall line groove extending from a right side surface of the second leg.

16 Claims, 11 Drawing Sheets

LINE BLOCK

BACKGROUND OF THE INVENTION

1. Field of the Invention

This invention relates generally to line blocks. In particular, the present invention relates to a line block to aid in the proper and efficient construction of brick walls, including brick walls having quoin corners.

2. Description of Related Art

When brick, block, or stone structures are built, it is important that any walls that form the structure are straight and level. Typically, once the framing of a wall has been completed and the brick is to be laid, corner poles are placed proximate the outside edges were the wall will be constructed and a string, or line, is stretched between any two corner poles to provide a straight reference line to which the wall can be built.

The line is initially placed proximate a respective ground level so that an initial line of bricks can be laid. As the wall is built upward, the line can be moved upward on the corner poles so as to provide a straight reference line for each subsequent row of bricks, blocks, or stones.

Certain wall structures include decorative quoin corners. Quoin corners are created when certain corner bricks, blocks, or stones are offset so as to extend beyond the plane created by the constructed wall structure in alternating patterns.

SUMMARY OF THE INVENTION

Unfortunately, when quoin corners are constructed, the positioning of the corner poles must be changed so that a straight reference line can be provided for setting the quoin corner blocks. Because of the difficulty this creates, it is common for the blocks that make up the quoin corner to be set without a straight reference line. Alternatively, during construction of a quoin corner wall structure, the wall structure is initially constructed with gaps where the quoin corner blocks are to be placed. Then, when the remaining wall structure has been constructed, the quoin corner blocks are set into the previously constructed portions of the wall structure.

The known methods for constructing quoin corner wall structures are inefficient and can produce inconsistent results.

Thus, the present invention is directed to a line block to aid in the proper and efficient construction of brick walls, including brick walls having quoin corners. In various exemplary, nonlimiting embodiments of the present invention, the line block comprises a line block body having a first leg and a second leg extending therefrom to form a substantially U-shaped line block. A corner pole receiving groove is defined by the line block body, the first leg, the second leg.

Each of the line block body, the first leg, and the second leg includes one or more quoin line grooves and wall line grooves line grooves formed so as to allow a line to be positioned within one or more of the grooves to provide a reference line for constructing either a wall or a standard section or a quoin corner portion of the wall.

In various exemplary, nonlimiting embodiments, the line block also includes a line extension leg having an extension leg line groove formed therein. The inclusion of the extension leg and line groove allows the line to be positioned relative the line block so as to allow easier manipulation of the line around the line block.

During use of the line block, corner poles are first placed proximate the outside edges were the wall will be constructed. A line block is then positioned at least partially around each of the corner poles and a line is routed through the wall line grooves of the at least two line blocks. In this manner, the string creates a straight reference line to which the wall can be built. As the wall is built upward, the line blocks can be moved upward along the corner poles so that a straight reference line can be provided for each subsequent row of blocks.

If quoin corners are to be constructed, the line blocks are aligned appropriately along the corner poles and the line can be moved from the wall line grooves to the quoin line grooves. When the line is routed through the quoin line grooves of the at least two line blocks, the string creates a straight reference line to which the quoin portions of the wall can be built.

When the quoin portion of the wall has been built, the line blocks are moved upward along the corner poles and the line can again be easily moved from the quoin line grooves to the wall line grooves, so that the standard wall portions can be built.

Accordingly, this invention provides a line block that is designed to be used to lay both wall brick and quoin corners.

This invention separately provides a line block that can be used with corner poles for brickwork.

This invention separately provides a line block that can be used to construct standard walls with no offsets.

This invention separately provides a line block that can be used to construct quoin portions of a wall with an offset.

These and other features and advantages of this invention are described in or are apparent from the following detailed description of the exemplary embodiments.

BRIEF DESCRIPTION OF THE DRAWINGS

The exemplary embodiments of this invention will be described in detail, with reference to the following figures, wherein like reference numerals refer to like parts throughout the several views, and wherein.

DETAILED DESCRIPTION OF EXEMPLARY EMBODIMENTS

Figure 1:
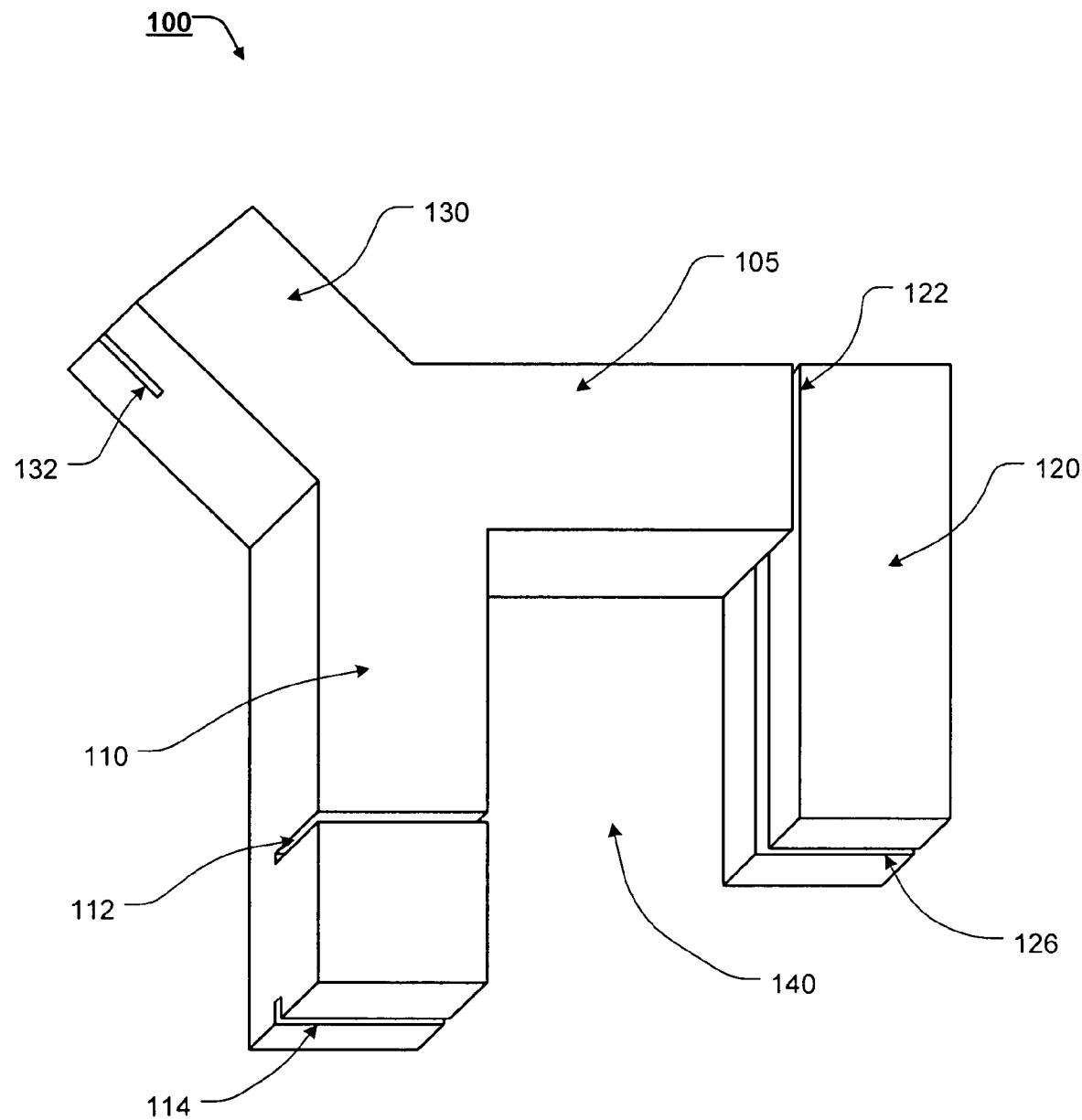
FIG. 1 shows a left perspective view of a first exemplary embodiment of a line block according to this invention.
Figure 2:
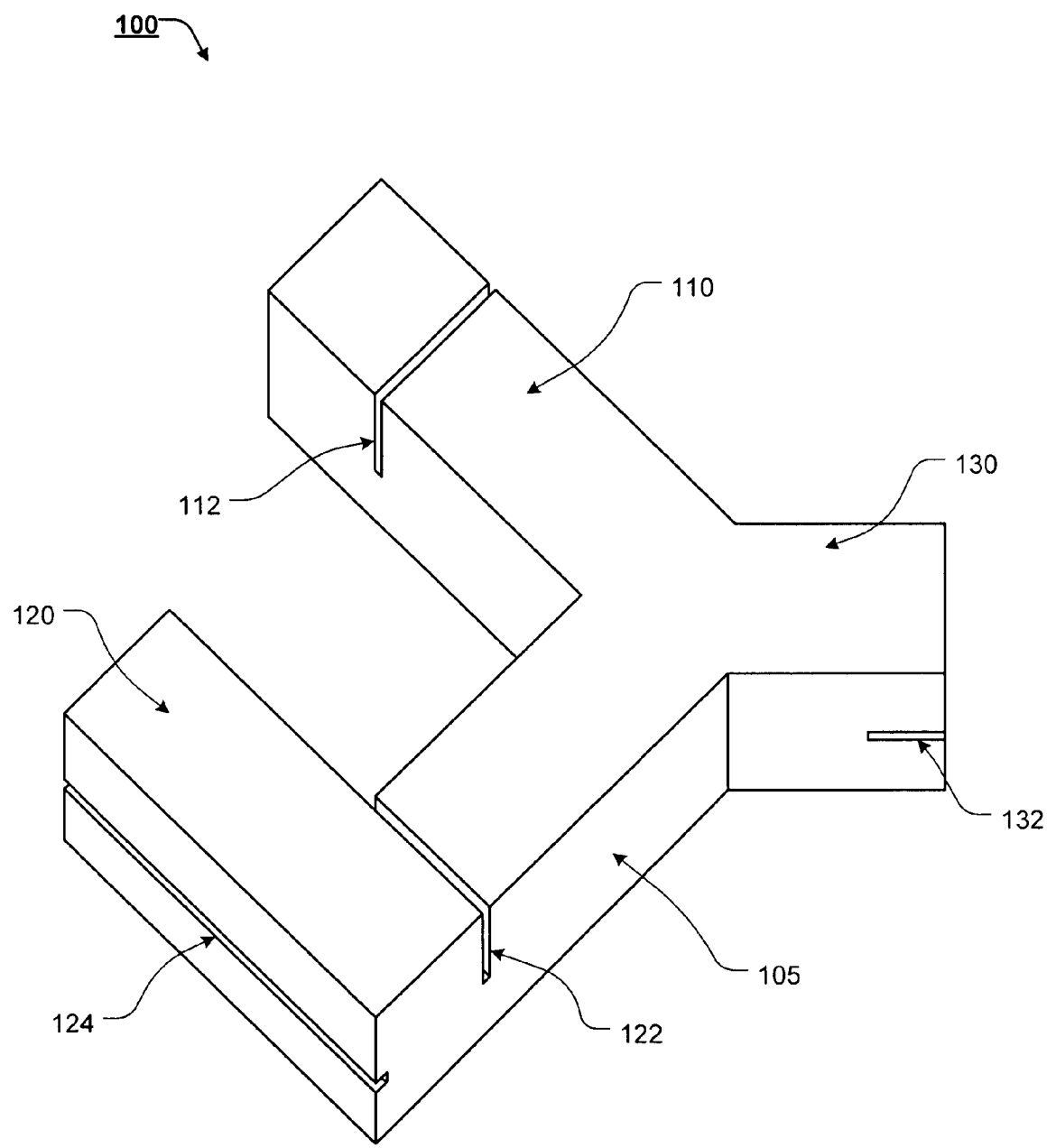
FIG. 2 shows a top perspective view of a first exemplary embodiment of a line block according to this invention.
Figure 3:
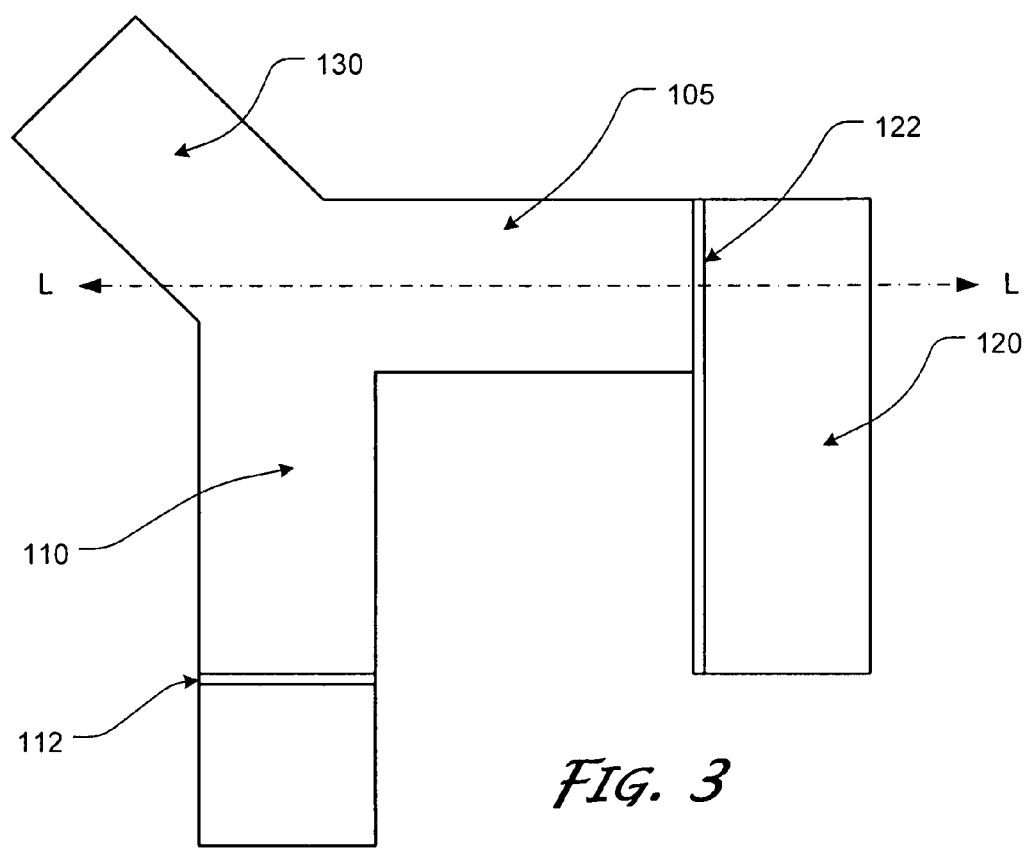
FIG. 3 shows a front view of a first exemplary embodiment of a line block according to this invention.
Figure 4:
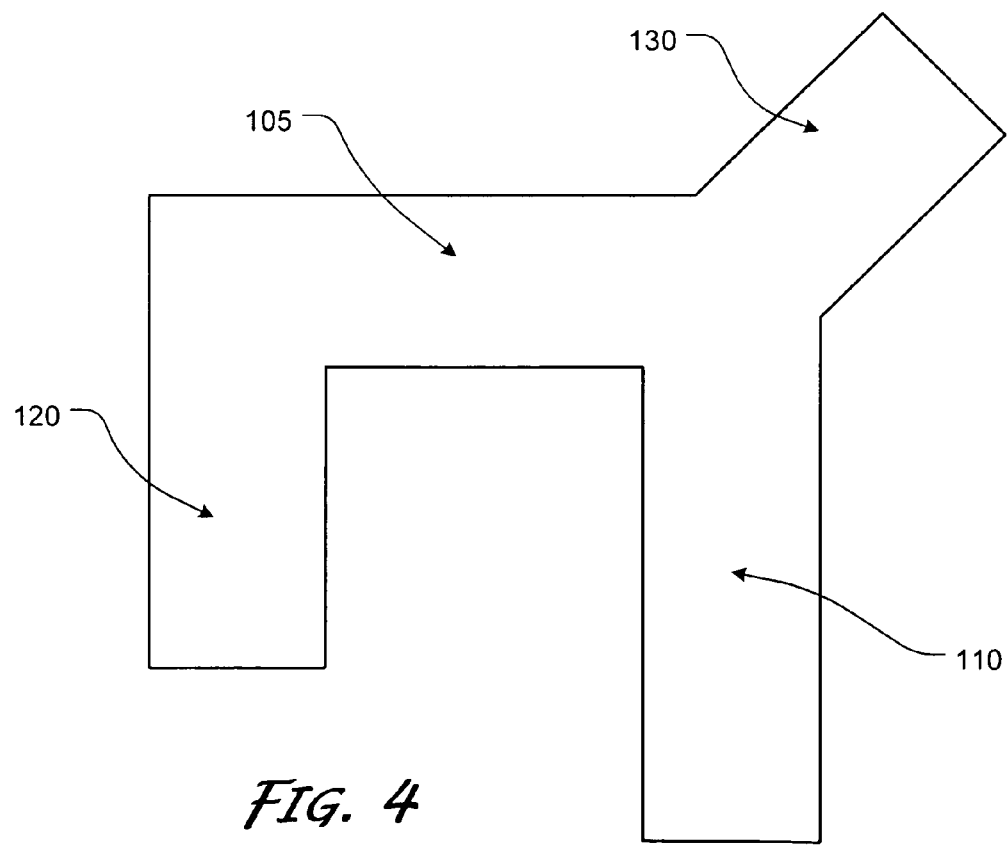
FIG. 4 shows a rear view of a first exemplary embodiment of a line block according to this invention.
Figure 5:
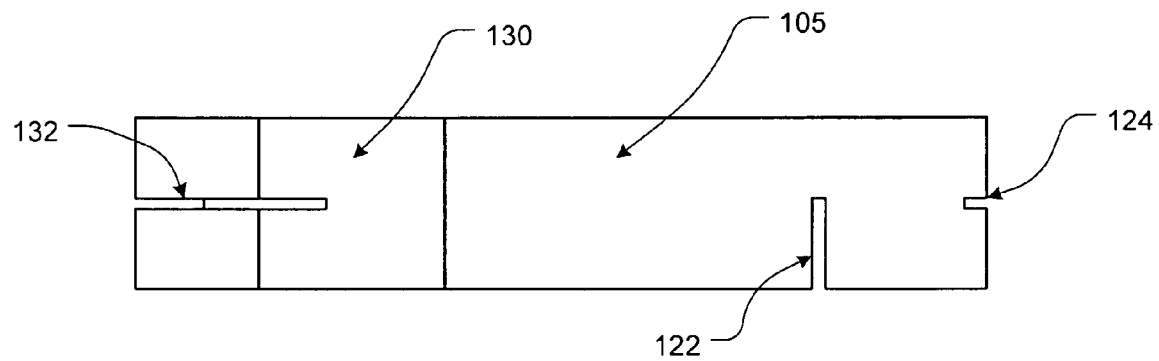
FIG. 5 shows a top view of a first exemplary embodiment of a line block according to this invention.
Figure 6:
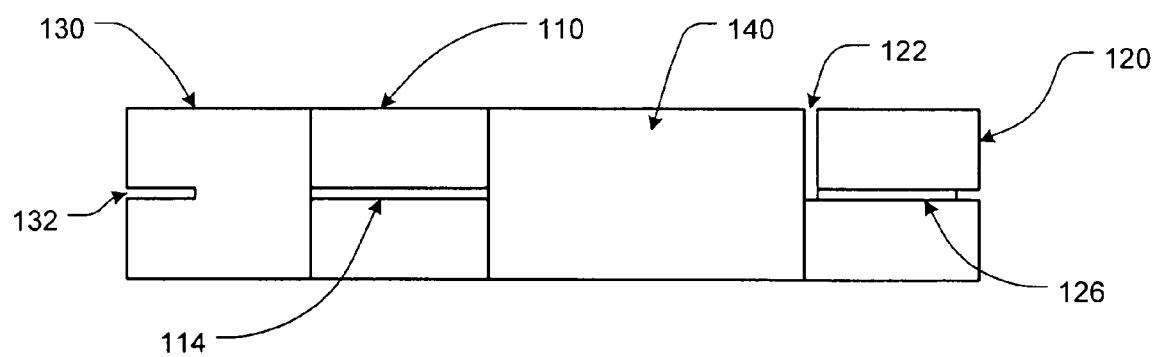
FIG. 6 shows a bottom view of a first exemplary embodiment of a line block according to this invention.
Figure 7:
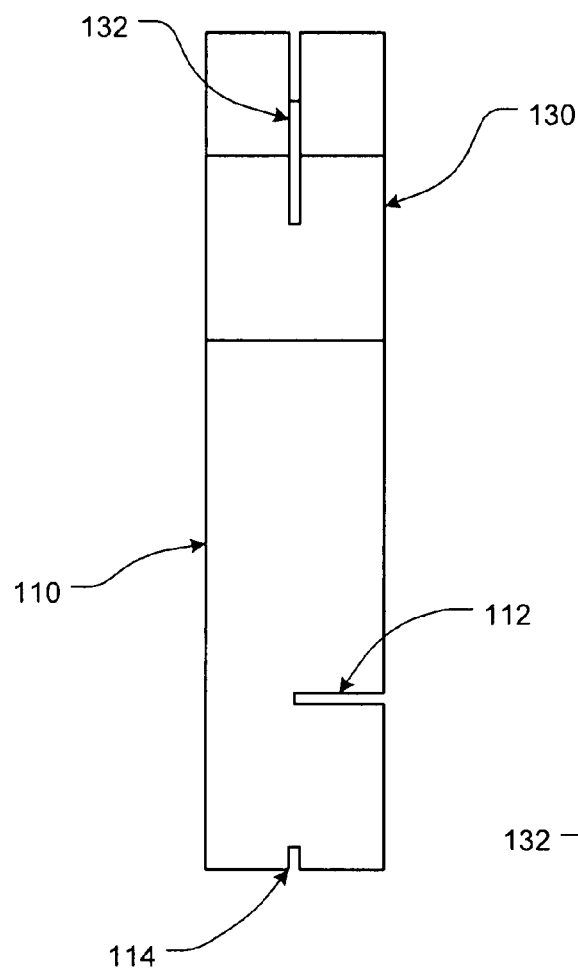
FIG. 7 shows a left side view of a first exemplary embodiment of a line block according to this invention.
Figure 8:
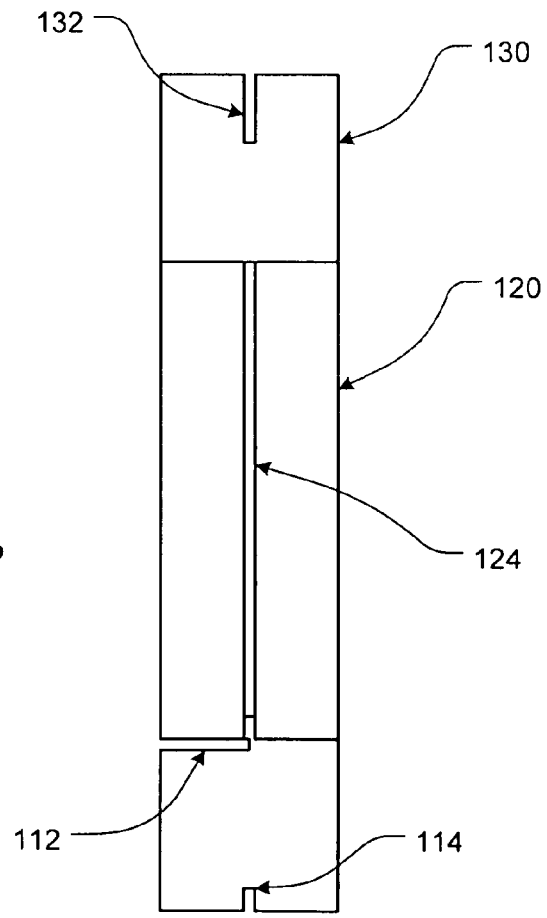
FIG. 8 shows a right side view of a first exemplary embodiment of a line block according to this invention.

For simplicity and clarification, the design factors and operating principles of the line block of this invention are explained with reference to various exemplary embodiments of a line block according to this invention. The basic explanation of the design factors and operating principles of the line block is applicable for the understanding, design, and use of the line block of this invention.

It should be appreciated that the terms "line block", "wall line", and "quoin line" are used for basic explanation and understanding of the systems, methods, and/or apparatuses of this invention. Therefore, the terms "line block", "wall line", and "quoin line" are not to be construed as limiting the systems, methods, and apparatuses of this invention.

It should also be appreciated that while the various exemplary embodiments of the present invention are primarily described and shown as being used to construct brick wall structures they should not be construed as limiting the usage of the present invention. Thus, it should be understood that the line block of the present invention can be used in the construction of any brick, block, stone, or other wall structure.

It should be understood that the absence of specific detail regarding the techniques used to construct a brick, block, stone, or other wall structure, and/or a quoin corner is intentional as the line block is designed to be utilized with a wide variety and combination of construction techniques and methods.

Turning now to the drawing figures, FIGS. 1-8 show various views of a first exemplary embodiment of a line block according to this invention. As illustrated in FIGS. 1-8, the line block 100 comprises at least some of a line block body 105 comprising a substantially elongate portion of material. A first leg 110 and a second leg 120 spaced apart from the first leg 110. Each of the first leg 110 and the second leg 120 extent substantially perpendicular to a longitudinal axis L-L, or main line of extension, of the body 105 so as to form a substantially U-shaped line block 100. A corner pole receiving groove 140 is defined by the body 105, the first leg 110, and the second leg 120.

In various exemplary, nonlimiting embodiments, the body 105, the first leg 110, and the second leg 120 each comprise a substantially square elongate portion of material. In certain exemplary embodiments, the body 105 comprises a 1"×1" block of material approximately 3¹³⁄₁₆" long. The first leg 110 comprises a 1"×1" block of material approximately 2¾" long. The second leg 120 comprises 81"×1" block of material approximately 1¾" long.

The first leg 110 includes a first leg quoin line groove 112 extending from a front surface of the first leg 110. In various exemplary embodiments, the first leg quoin line groove 112 extends approximately ½" from the front surface of the first leg 110. The first leg quoin line groove 112 is positioned such that when the line block 100 is in use, a line can be routed through the first leg quoin line groove 112 in order to provide a reference for construction of a quoin portion of a wall structure.

The first leg 110 also includes a first leg wall line groove 114 extending from a bottom surface of the first leg 110. In various exemplary embodiments, the first leg wall line groove 114 extends approximately ⅛" from the bottom surface of the first leg 110. The first leg wall line groove 114 is positioned such that when the line block 100 is in use, a line can be routed through the first leg wall line groove 114 in order to provide a reference for construction of a wall portion of a wall structure.

The second leg 120 includes a second leg quoin line groove 122 extending from a front surface of the body 105 and a front surface of the second leg 120, along a portion of an inner wall surface of the second leg 120. In various exemplary embodiments, the second leg quoin line groove 122 extends approximately ½" from the front surface of the second leg 120. The second leg quoin line groove 122 is positioned such that when the line block 100 is in use, a line can be routed through the second leg quoin line groove 122 in order to provide a reference for construction of a quoin portion of a wall structure. The second leg quoin line groove 122 extends along a portion of the inner wall surface of the second leg 120, such that when the line block 100 is in place around a corner pole 160, the line can be routed between the corner pole 160 and the second leg 120.

The second leg 120 also includes a second leg wall line groove 124 extending from a right side surface of the second leg 120. In various exemplary embodiments, the second leg wall line groove 124 extends approximately ⅛" from the right side surface of the second leg 120. The second leg wall line groove 124 is positioned such that when the line block 100 is in use, a line can be routed through the second leg wall line groove 124 in order to provide a reference for construction of a wall portion of a wall structure.

In various exemplary embodiments, the second leg 120 also includes a second leg supplemental quoin line groove 126 extending from a bottom surface of the second leg 120. In various exemplary embodiments, the second leg supplemental quoin line groove 126 extends approximately ⅛" from the bottom surface of the second leg 120. The second leg supplemental quoin line groove 126 is positioned such that when the line block 100 is in use and a line is routed through the first leg quoin line groove 112, the line can also be routed through the second leg supplemental quoin line groove 126 in order to provide additional positioning of the line.

In various exemplary, nonlimiting embodiments, the line block 100 also comprise a line extension leg 130 extending from the body 105. In various exemplary embodiments, the line extension leg 130 extends from the body 105 at approximately a 135° angle relative to the longitudinal axis L-L of the body 105.

In certain exemplary embodiments, the line extension leg 130 comprises a substantially square elongate portion of material. In certain exemplary embodiments, the line extension leg 130 comprises a 1"×1" block of material approximately 1½" long.

The extension leg 130 is positioned such that when the line block 100 is in use, a line can be routed around the extension leg 130 in order to so as to allow the line to be positioned above at least a portion of the surface of the body 105 and the first leg 110 for easier manipulation of the line around the line block 100.

In various exemplary embodiments, the line extension leg 130 also includes an extension leg line groove 132 extending from a surface of the line extension leg 130. In various exemplary embodiments, the extension leg line groove 132 extends approximately ⅛" from the surface of the line extension leg 130. The extension leg line groove 132 is positioned such that when the line block 100 is in use, a line can be routed through the extension leg line groove 132 in order to so as to allow the line to be positioned above at least a portion of the surface of the body 105 and the first leg 110 for easier manipulation of the line around the line block 100.

Therefore, it should be appreciated that the line extension leg 130 may merely comprise a bump, protrusion, or extension of the body 105 and/or first leg 110 sufficient to a line to be positioned above a surface of the first leg 110 and/or the second leg 120.

The specific dimensions outlined herein can be utilized to construct a line block 100 that can be usable in constructing a quoin corner having a 1" offset. It should be appreciated that the dimensions of the line block 100 may be altered such that the resulting line block can be usable in constructing quoin corners having various offsets.

It should be appreciated that each of the elements comprising the line block 100 may be integrally formed as a single line block 100. Alternatively, each of the elements may be formed as separate and distinct components coupled or joined together to form the line block 100.

In various exemplary embodiments, various portions of the line block 100 are formed of a plastic or polymeric material, such as a polymeric composite. Alternate materials of construction may include one or more of the following: wood, steel, aluminum, titanium, and/or other metals, as well as various alloys and composites thereof, glass-hardened polymers, polymer or fiber reinforced metals, carbon fiber or glass fiber composites, continuous fibers in combination with thermoset and thermoplastic resins, chopped glass or carbon fibers used for injection molding compounds, laminate glass or carbon fiber, epoxy laminates, woven glass fiber laminates, impregnate fibers, polyester resins, epoxy resins, phenolic resins, polyimide resins, cyanate resins, high-strength plastics, nylon, glass or polymer fiber reinforced plastics, thermoform and/or thermoset sheet materials, and/or various combinations of the foregoing. Thus, it should be understood that the material or materials used to form the line block 100 or various portions of the line block 100 is a design choice based on the desired appearance and/or functionality of the line block 100.

Figure 9:
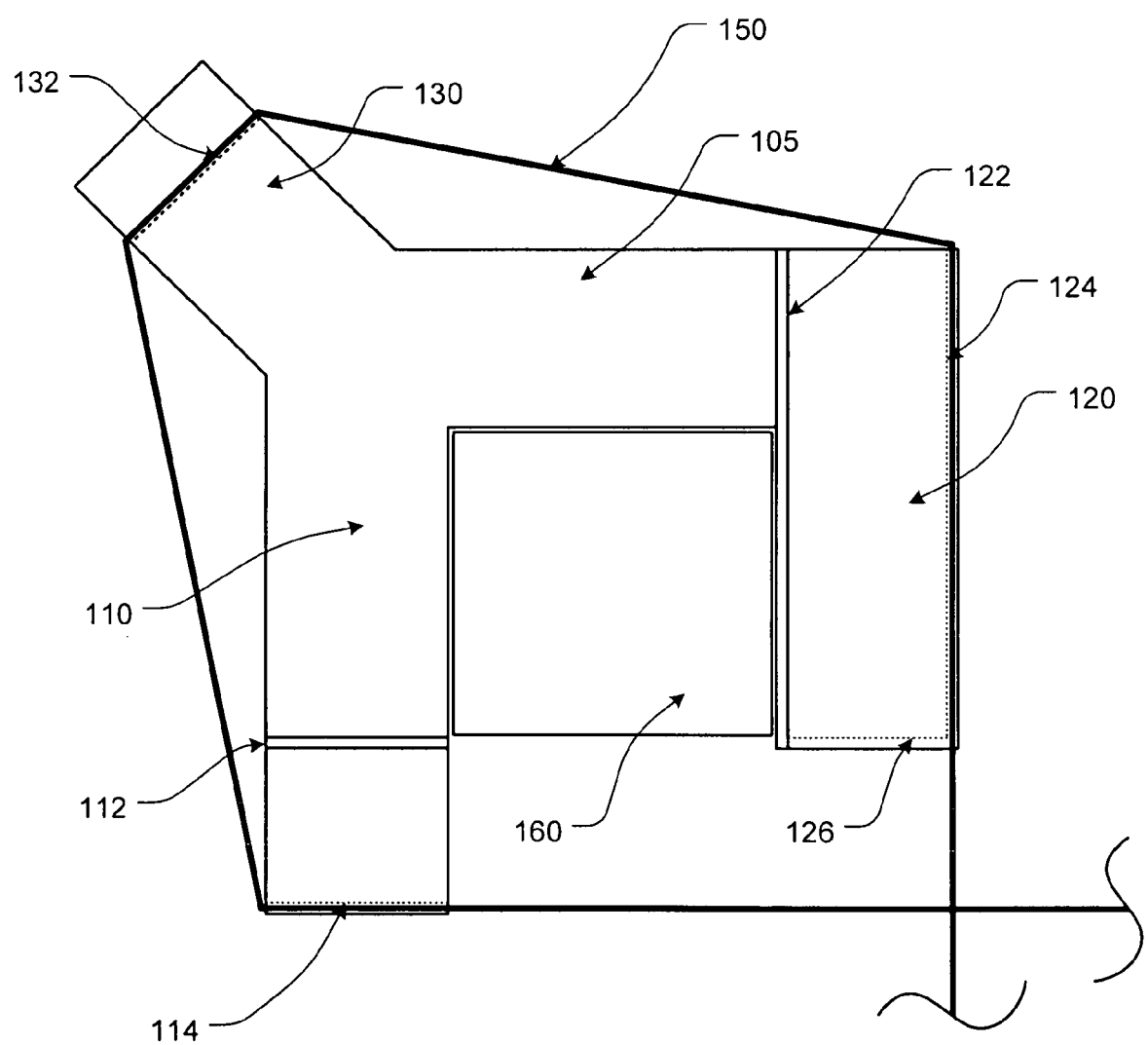
FIG. 9 shows a top view of the first exemplary embodiment of the line block according to this invention, wherein a line is routed through the line block in a position so as to allow for construction of a wall portion of a brick wall structure.
Figure 10:
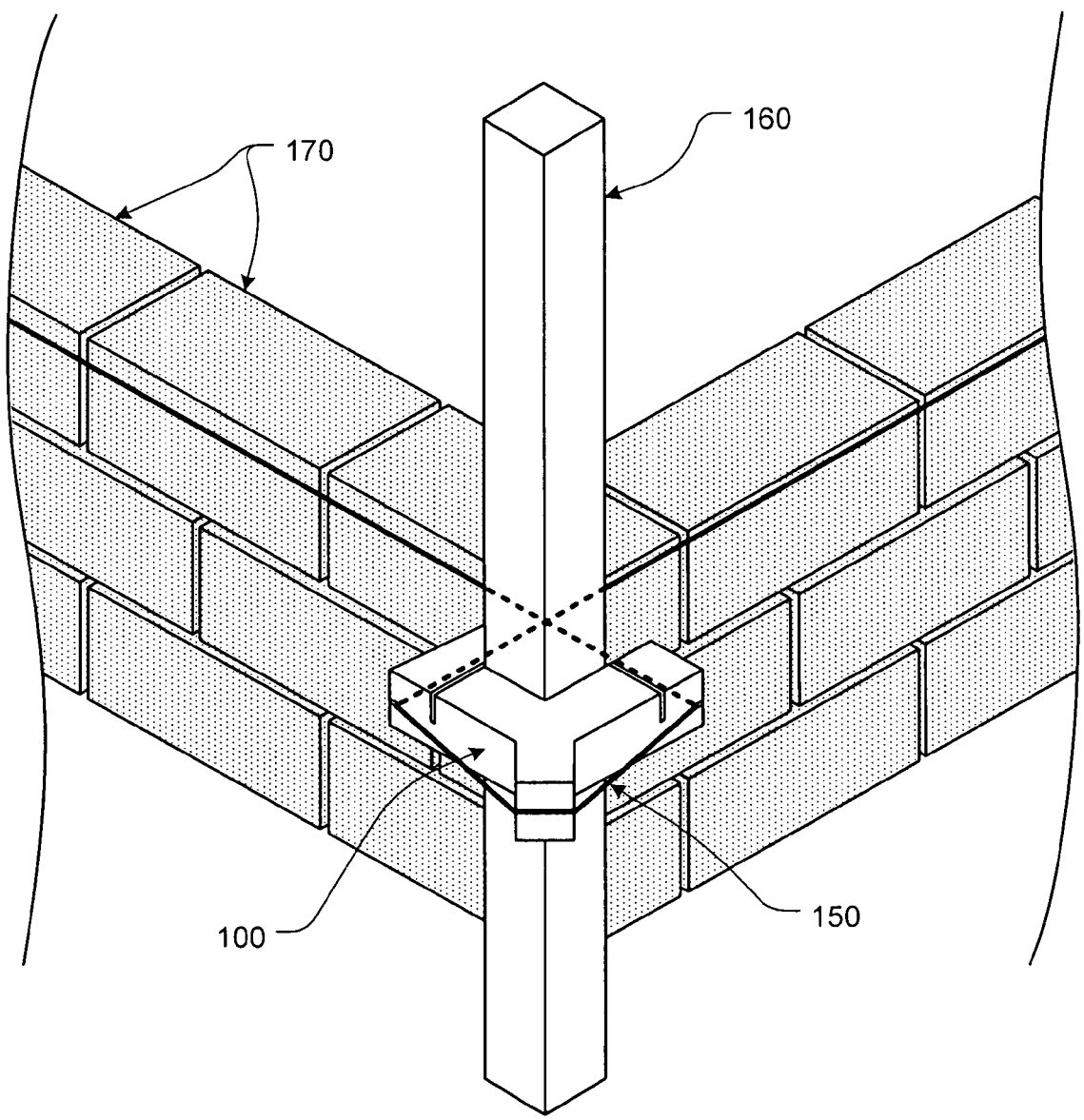
FIG. 10 shows a perspective view of the first exemplary embodiment of the line block according to this invention, wherein the line block is positioned for construction of a wall portion of a brick wall structure.
Figure 11:
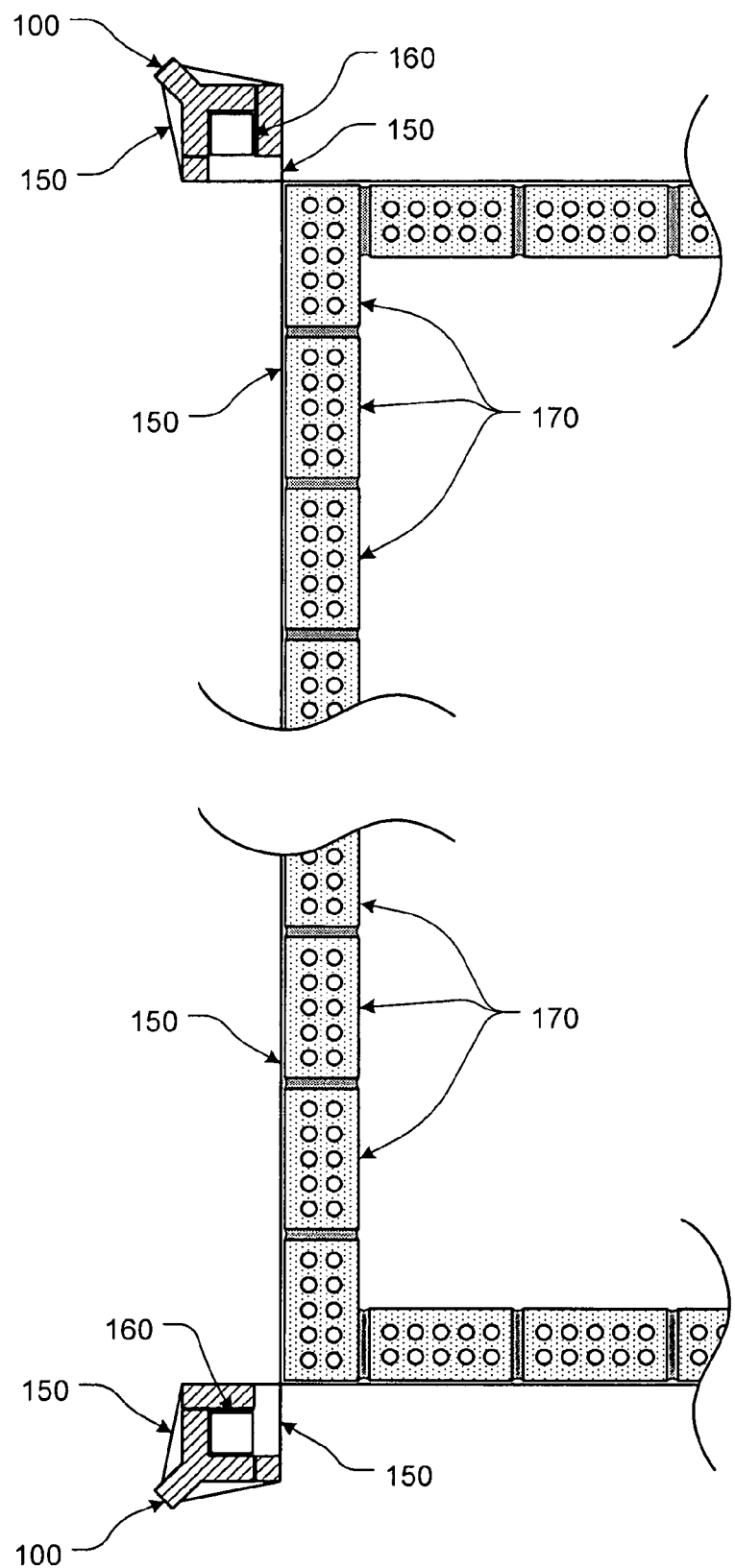
FIG. 11 shows a top view of the first exemplary embodiment of the line block according to this invention, wherein two line blocks are shown positioned for construction of a wall portion of a brick wall structure.
Figure 12:
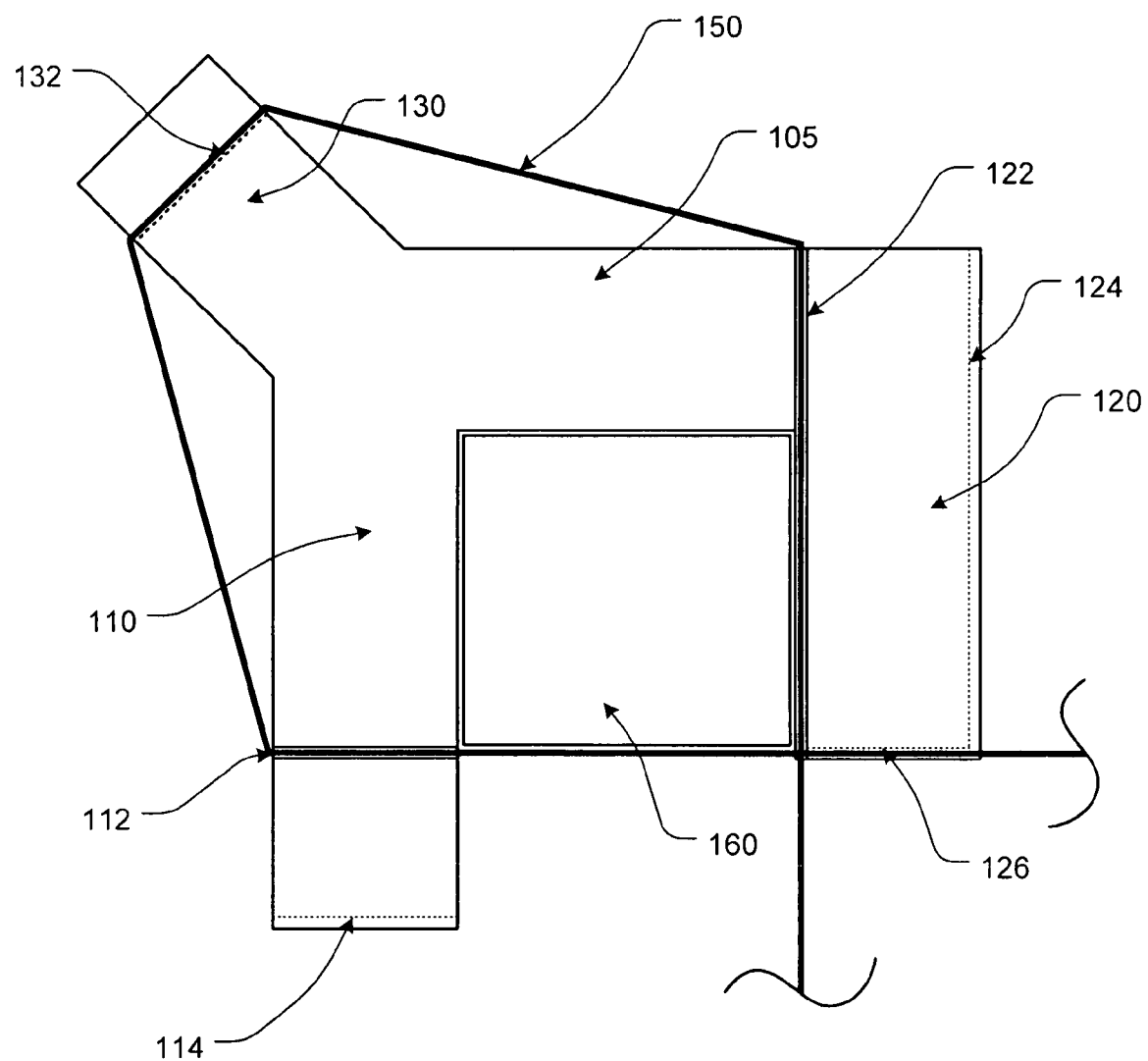
FIG. 12 shows a top view of the first exemplary embodiment of the line block according to this invention, wherein a line is routed through the line block in a position so as to allow for construction of a quoin corner portion of a brick wall structure.
Figure 13:
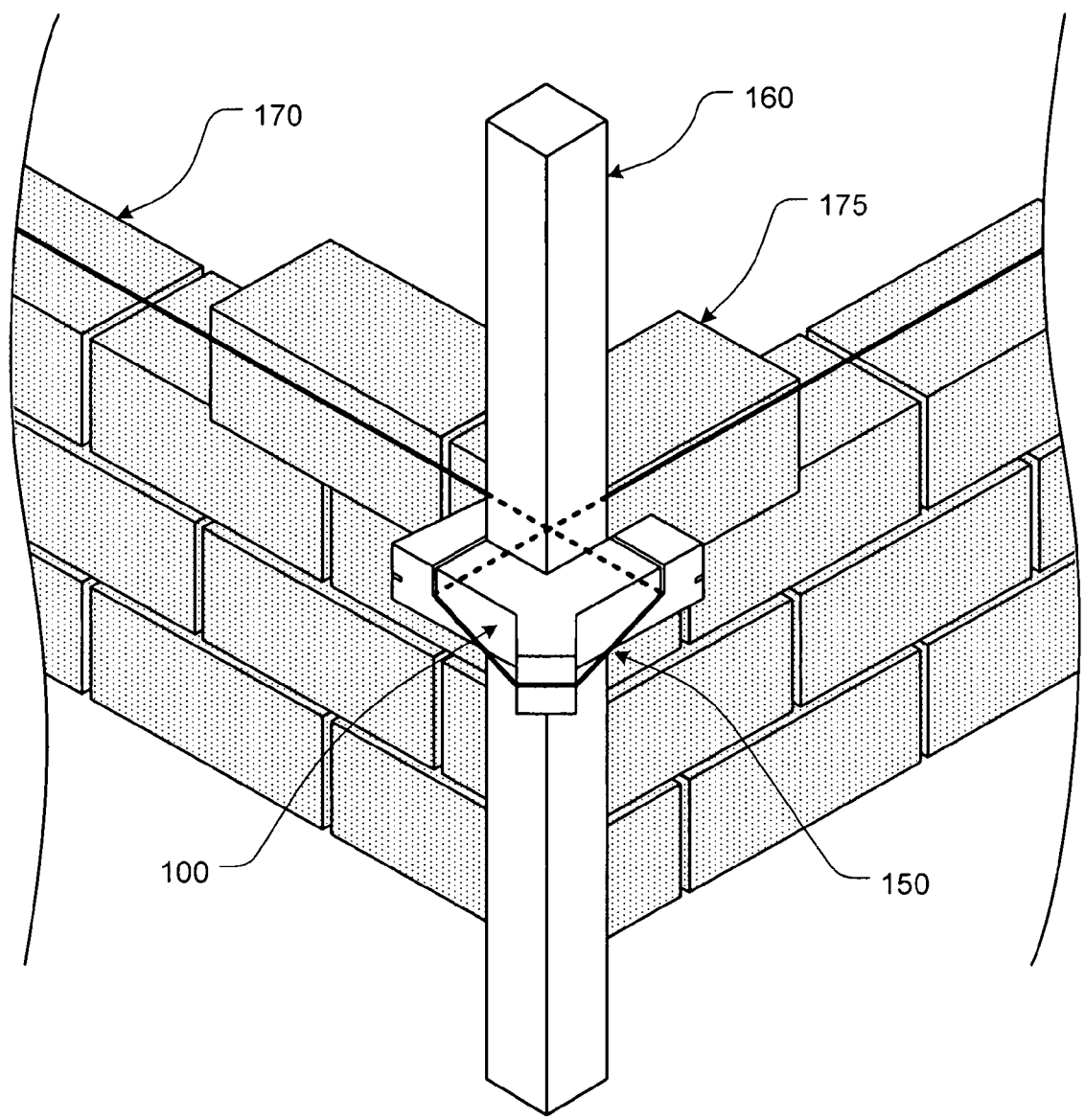
FIG. 13 shows a perspective view of the first exemplary embodiment of the line block according to this invention, wherein the line block is positioned for construction of a quoin corner portion of a brick wall structure.
Figure 14:
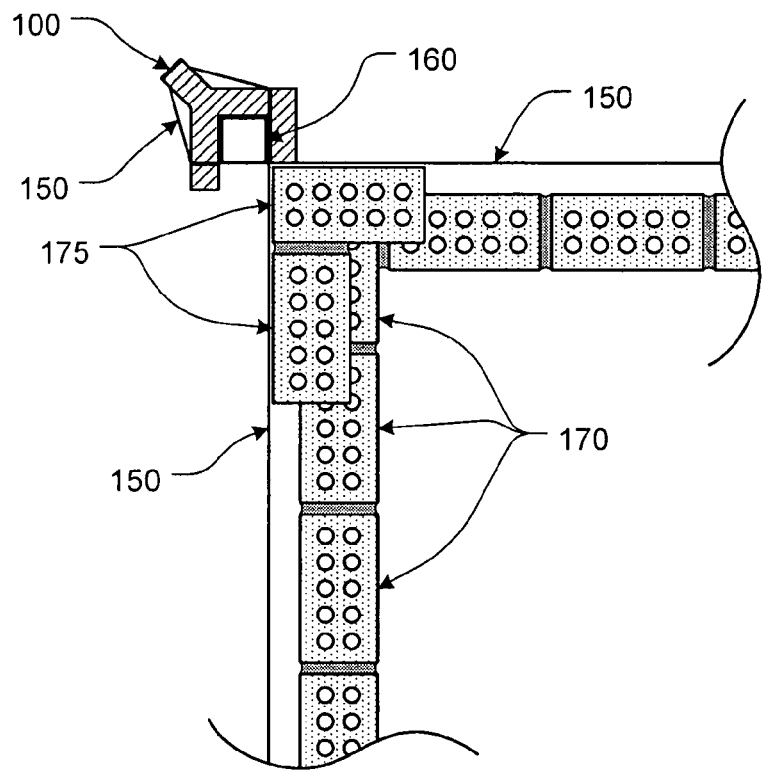
FIG. 14 shows a top view of the first exemplary embodiment of the line block according to this invention, wherein two line blocks are shown positioned for construction of a quoin corner portion of a brick wall structure.
Figure 14:
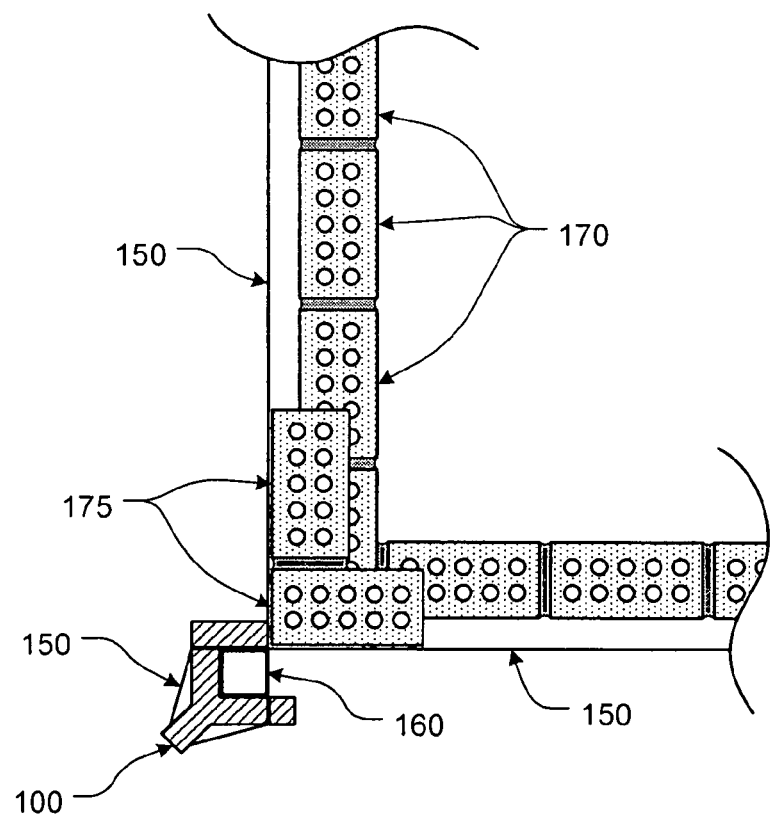

FIGS. 9-14 show exemplary use of the line block 100. More specifically, FIGS. 9-11 illustrate an exemplary line being routed through the line block 100 in a position for use in construction of a wall portion of a brick wall structure and the line block 100 being used in the construction of a wall portion of a brick wall structure, while FIGS. 12-14 illustrate an exemplary line being routed through the line block 100 in a position for use in construction of a quoin corner portion of a brick wall structure and the line block 100 being used in the construction of a quoin corner portion of a brick wall structure.

As illustrated in FIGS. 9-11, in order to be used to construct a wall portion of a brick wall structure, the line block 100 is placed around a corner poll 160 and positioned appropriately along the corner poll 160. Then, a line 150 is routed through the first leg wall line groove 114, the extension leg line groove 132, and the second leg wall line groove 124 of the line block 100.

It should be appreciated that the line is drawn tight by appropriate routing through another line block 100 used in conjunction with another corner poll 160. It should also be appreciated that to line blocks 100 can be utilized to construct a single wall, three line blocks 100 can be utilized to construct two walls that are perpendicular to one another, and for line blocks 100 can be utilized to construct four walls in a rectangular or square configuration. Additional line blocks 100 can be utilized together in various combinations to construct any number of walls at right angles to one another.

Once the line 150 has been routed appropriately through the wall line grooves of two or more line blocks 100, the line 150 creates a straight reference line to which wall bricks 170 can be aligned. As the wall is built upward, by continuing to lay wall bricks 170, the line blocks 100 can be moved upward along the corner poles 160 so that a straight reference line can be provided for each subsequent row of wall bricks 170.

If quoin corners are to be constructed, the line 150 can be moved from the first leg wall line groove 114, and the second leg wall line groove 124 to the first leg calling line groove 112 and the second leg quoin line groove 122, respectively, as illustrated in FIGS. 12-14. It should be appreciated that the line 150 may remain in the extension leg line groove 132.

When the line is routed through the quoin line grooves of the at least two line blocks 100, the line 150 creates a straight reference line to which the quoin bricks 175 of the wall can be aligned.

When the quoin portion of the wall has been built, the line blocks 100 may be moved upward along the corner poles 160 and the line 150 can again be easily moved from the quoin line grooves to the wall line grooves, so that the standard wall portions can continue to be constructed.

While this invention has been described in conjunction with the exemplary embodiments outlined above, it is evident that many alternatives, modifications, and variations will be apparent to those skilled in the art. Any and all such adaptations, modifications, and variations should and are intended to be comprehended within the meaning and range of equivalents of the disclosed exemplary embodiments.

It is to be understood that the phraseology of terminology employed herein is for the purpose of description and not of limitation. Accordingly, the foregoing description of the exemplary embodiments of the invention, as set forth above, are intended to be illustrative, not limiting. Various changes, modifications, and/or adaptations may be made without departing from the spirit and scope of this invention.

What is claimed is:

1. A line block, comprising:
   a body comprising an elongate portion of material;
   a first leg comprising an elongate portion of material extending substantially perpendicular to a longitudinal axis of the body;
   a first leg quoin line groove extending from a front surface of the first leg;
   a first leg wall line groove extending from a bottom surface of the first leg;
   a second leg spaced apart from the first leg and comprising an elongate portion of material, wherein the second leg extends substantially perpendicular to a longitudinal axis of the body, wherein a corner pole receiving groove is defined between at least a portion of the body, the first leg, and the second leg;
   a second leg quoin line groove extending from a front surface of the body and a front surface of the second leg, along a portion of an inner wall surface of the second leg; and
   a second leg wall line groove extending from a right side surface of the second leg;
   a line extension leg extending from the body, wherein the extension leg is positioned such that when the line block is in use, a line can be routed around the extension leg in order to so as to allow the line to be positioned above at least a portion of the surface of the body and the first leg for easier manipulation of the line around the line block, and wherein the line extension leg includes an extension leg line groove extending from a surface of the line extension leg, wherein the extension leg line groove is positioned such that when the line block is in use, a line can be routed through the extension leg line groove in order to so as to allow the line to be positioned above at least a portion of the surface of the body and the first leg for easier manipulation of the line around the line block.

2. The line block of claim 1, wherein the first leg and a second leg extend from the body so as to form a substantially U-shaped line block.

3. The line block of claim 1, wherein the body, the first leg, and the second leg each comprise a substantially square portion of material.

4. The line block of claim 1, wherein the first leg quoin line groove extends approximately ½" from the front surface of the first leg.

5. The line block of claim 1, wherein the first leg quoin line groove is positioned such that when the line block is in use, a line can be routed through the first leg quoin line groove in order to provide a reference for construction of a quoin portion of a wall structure.

6. The line block of claim 1, wherein the first leg wall line groove extends approximately ⅛" from the bottom surface of the first leg.

7. The line block of claim 1, wherein the first leg wall line groove is positioned such that when the line block is in use, a line can be routed through the first leg wall line groove in order to provide a reference for construction of a wall portion of a wall structure.

8. The line block of claim 1, wherein the second leg quoin line groove extends approximately ½" from the front surface of the second leg.

9. The line block of claim 1, wherein the second leg quoin line groove is positioned such that when the line block is in use, a line can be routed through the second leg quoin line groove in order to provide a reference for construction of a quoin portion of a wall structure.

10. The line block of claim 1, wherein the second leg wall line groove extends approximately ⅛" from the right side surface of the second leg.

11. The line block of claim 1, wherein the second leg wall line groove is positioned such that when the line block is in use, a line can be routed through the second leg wall line groove in order to provide a reference for construction of a wall portion of a wall structure.

12. The line block of claim 1, wherein the second leg further comprises a second leg supplemental quoin line groove extending from a bottom surface of the second leg.

13. The line block of claim 12, wherein the second leg supplemental quoin line groove extends approximately ⅛" from the bottom surface of the second leg.

14. The line block of claim 12, wherein the second leg supplemental quoin line groove is positioned such that when the line block is in use and a line is routed through the first leg quoin line groove, the line can also be routed through the second leg supplemental quoin line groove in order to provide additional positioning of the line.

15. The line block of claim 1, wherein the line extension leg extends from the body at approximately a 135° angle relative to the longitudinal axis of the body.

16. The line block of claim 1, wherein the first leg and the second leg are formed integral to the body.

* * * * *